(12) United States Patent
Yasuda et al.

(10) Patent No.: US 10,865,680 B2
(45) Date of Patent: Dec. 15, 2020

(54) EXHAUST GAS PURIFYING DEVICE OF WORK MACHINE

(71) Applicant: Hitachi Construction Machinery Co., Ltd., Tokyo (JP)

(72) Inventors: Gen Yasuda, Ibaraki (JP); Takenori Hiroki, Ami-machi (JP); Ryou Takaichi, Chiba (JP); Hisashi Tago, Chiba (JP); Hironori Itou, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 359 days.

(21) Appl. No.: 15/774,312

(22) PCT Filed: Oct. 28, 2016

(86) PCT No.: PCT/JP2016/082111
§ 371 (c)(1),
(2) Date: May 8, 2018

(87) PCT Pub. No.: WO2017/082087
PCT Pub. Date: May 18, 2017

(65) Prior Publication Data
US 2020/0256230 A1    Aug. 13, 2020

(30) Foreign Application Priority Data

Nov. 9, 2015    (JP) .................................. 2015-219526

(51) Int. Cl.
*F01N 3/20*    (2006.01)
*F01N 11/00*    (2006.01)

(52) U.S. Cl.
CPC .............. *F01N 3/208* (2013.01); *F01N 11/00* (2013.01); *F01N 2550/05* (2013.01);
(Continued)

(58) Field of Classification Search
CPC ... F01N 11/00; F01N 3/00; F01N 3/08; F01N 3/18; F01N 3/2066; F01N 2550/05;
(Continued)

(56) References Cited

U.S. PATENT DOCUMENTS

| 2007/0202019 | A1 | 8/2007 | Nishina et al. |
| 2014/0331650 | A1* | 11/2014 | Yang ................... G01F 23/2961 60/277 |
| 2015/0033700 | A1 | 2/2015 | Schlenke |

FOREIGN PATENT DOCUMENTS

| JP | 63-250559 A | 10/1988 |
| JP | 63250559 A * | 10/1988 |

(Continued)

OTHER PUBLICATIONS

Machine Translation of JP-63250559-A (Year: 1988).*
(Continued)

*Primary Examiner* — Brandon D Lee
(74) *Attorney, Agent, or Firm* — Crowell & Moring LLP (57) ABSTRACT

A reduction in measurement accuracy of a concentration sensor is minimized. An exhaust gas purifying device of a work machine includes a reduction catalyst that is placed in an exhaust flow passage of an exhaust gas of an engine and uses a reducing agent to reduce and purify nitrogen oxides in the exhaust gas, and a reducing agent injector to inject the reducing agent into the exhaust flow passage. The exhaust gas purifying device of a work machine includes: a storage unit that stores the reducing agent; a concentration sensor that has a sensing part placed within the storage unit to detect a concentration of the reducing agent; an air-bubble removal device that injects the reducing agent toward the sensing part; and a reducing agent pump that supplies the reducing agent in the storage unit to the air-bubble removal device.

3 Claims, 7 Drawing Sheets

(52) U.S. Cl.
CPC .... *F01N 2610/02* (2013.01); *F01N 2610/146* (2013.01); *F01N 2610/148* (2013.01); *F01N 2610/1433* (2013.01); *F01N 2900/1808* (2013.01); *F01N 2900/1818* (2013.01)

(58) Field of Classification Search
CPC ......... F01N 2610/02; F01N 2610/1433; F01N 2610/146; F01N 2610/148; F01N 2900/1808; F01N 2900/1818; Y02T 10/47
See application file for complete search history.

(56) References Cited

FOREIGN PATENT DOCUMENTS

| | | |
|---|---|---|
| JP | 2005-299441 A | 10/2005 |
| JP | 2006-125317 A | 5/2006 |

OTHER PUBLICATIONS

International Search Report (PCT/ISA/210) issued in PCT Application No. PCT/JP2016/082111 dated Dec. 20, 2016 with English translation (four pages).
Japanese-language Written Opinion (PCT/ISA/237) issued in PCT Application No. PCT/JP2016/082111 dated Dec. 20, 2016 (four pages).

\* cited by examiner

EXHAUST GAS PURIFYING DEVICE OF WORK MACHINE

TECHNICAL FIELD

The present invention relates to an exhaust gas purifying device for a work machine.

BACKGROUND ART

A work machine equipped with an exhaust gas purifying device to remove nitrogen oxides (NOx) from the exhaust gas is known (see Patent Literature 1). In some exhaust gas purifying devices of this kind, a reduction catalyst is placed in an exhaust system of an engine and a reducing agent is supplied through a reducing agent injector which is installed in the exhaust passage upstream of the reduction catalyst. Upon NOx in the exhaust gas coming into contact with the reducing agent, a reduction reaction is speeded up in the reduction catalyst, thus purifying the NOx to become a harmless component.

The reduction reaction is a reduction reaction of NOx and ammonia, and, for example, an aqueous solution of urea (hereinafter referred to simply as "urea water") is used as a reducing agent to evolve ammonia with efficiency. A urea water is stored in a urea water tank, and a required amount of urea water is drawn up from the urea water tank by a urea water pump on the basis of exhaust temperature, the amount of NOx emission and/or the like, which is then supplied to a urea water injector.

The work machine includes a concentration sensor to monitor concentration of urea water in the urea water tank. If anomaly of concentration of urea water occurs, countermeasures are taken such as displaying of a warning image on a display screen of a display apparatus, limiting of the engine output, and/or the like.

However, the urea water in the urea water tank tends to form air bubbles due to vibrations of the work machine, which raises an issue of reduced measurement accuracy due to the adhesion of air bubbles to a sensing part of the concentration sensor. If a false detection of a concentration anomaly occurs, this causes a warning image to be displayed on a display screen, and/or the engine output to be limited. Patent Literature 1 discloses a technique to prevent air bubbles from adhering to the sensing part of the concentration sensor by covering the sensing part of the concentration sensor with a bubble trap filter.

CITATION LIST

Patent Literature

PATENT LITERATURE 1: JP-A NO. 2005-299441

SUMMARY OF INVENTION

Technical Problem

The work machine is operated in harsher environments than automobile, and often vibrates violently during work. Because of this, in the work machine, the vibrations cause waves on the fluid surface, so that air bubbles easily occur in the tank. Further, in comparison with automobile capable of using traveling air to remove heat from the engine room, in the work machine, the heat-balance temperature is higher, so that the urea water tends to increase in temperature and therefore air bubbles coming from a temperature rise easily develop.

In this manner, the work machine often causes air bubbles to occur as compared with automobile, and therefore, for the work machine, the trap filter described in Patent Literature 1 cannot sufficiently achieve the desired effects. Further, the trap filter described in Patent Literature 1 cannot inhibit the air bubbles developing on the inside of the trap filter from adhering to the sensing part of the concentration sensor. That is, the trap filter described in Patent Literature 1 may bring about a reduction in measurement accuracy of the concentration sensor.

Solution to Problem

An exhaust gas purifying device of a work machine according to an aspect of the present invention includes a reduction catalyst that is placed in an exhaust flow passage of an exhaust gas of an engine and uses a reducing agent to reduce and purify nitrogen oxides in the exhaust gas, and a reducing agent injector to inject the reducing agent into the exhaust flow passage. The exhaust gas purifying device of a work machine includes: a storage unit that stores the reducing agent; a concentration sensor that has a sensing part placed within the storage unit to detect a concentration of the reducing agent; an air-bubble removal device that injects the reducing agent toward the sensing part; and a reducing agent pump that supplies the reducing agent in the storage unit to the air-bubble removal device.

Advantageous Effects of Invention

According to the present invention, because removal of air bubbles adhering to a sensing part of a concentration sensor is enabled, a reduction in measurement accuracy of a concentration sensor is able to be minimized.

DESCRIPTION OF EMBODIMENTS

First Embodiment

An embodiment according to the present invention will now be described with reference to the accompanying drawings.

Figure 1:
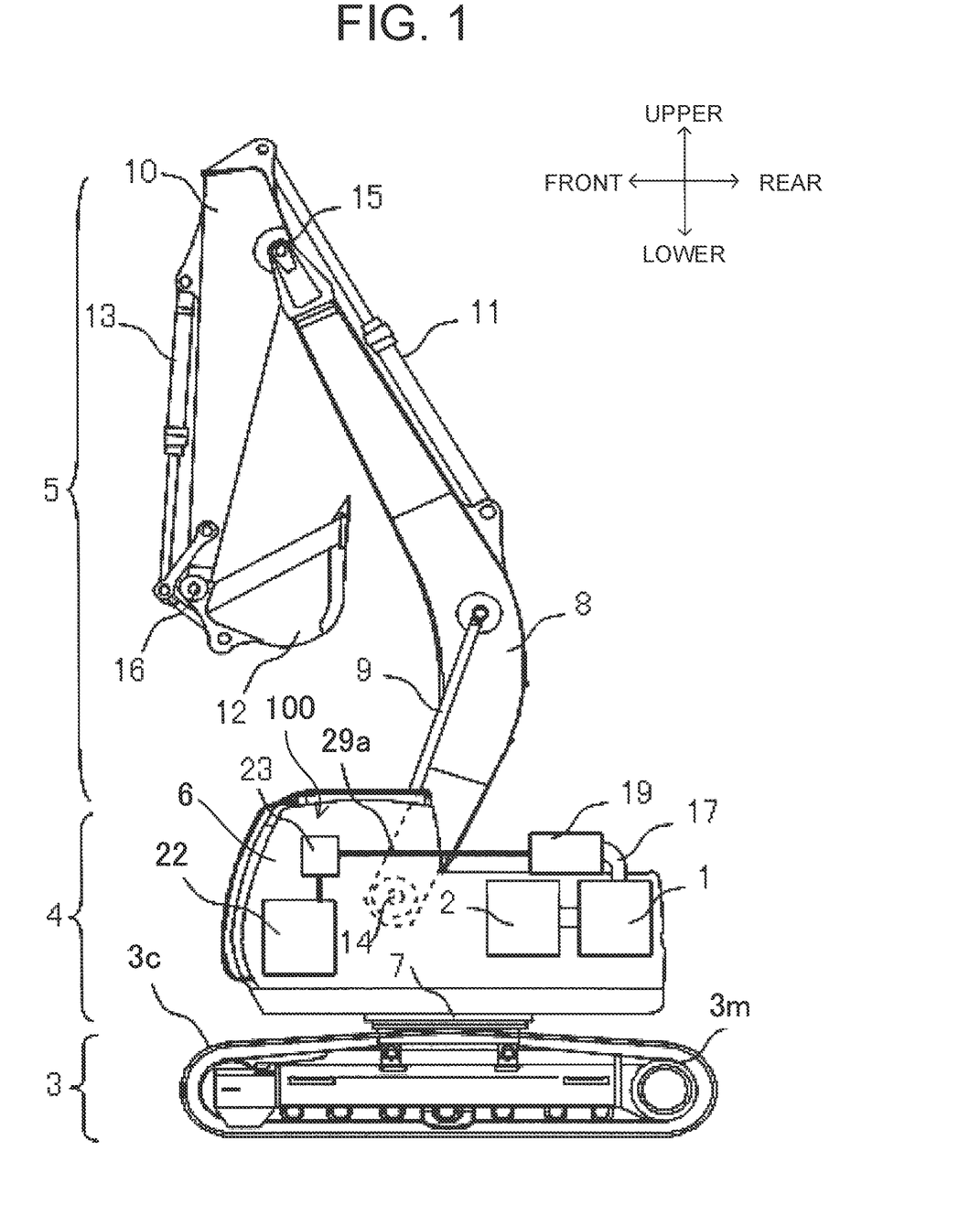
FIG. 1 is a schematic diagram illustrating a hydraulic excavator equipped with an exhaust gas purifying device according to a first embodiment.

FIG. 1 is a schematic diagram illustrating a hydraulic excavator which is an example work machine equipped with an exhaust gas purifying device according to the first embodiment.

Incidentally, for convenience in describing, front, rear, up and down directions are specified as shown in FIG. 1.

As illustrated in FIG. 1, the hydraulic excavator includes an undercarriage 3 and an upperstructure 4 which is mounted turnably on the undercarriage 3 through a slewing ring 7. The undercarriage 3 travels by using travel hydraulic motors 3m to drive a pair of left and right crawlers 3c.

A cab 6 is arranged on the left side of a front portion of the upperstructure 4, and an engine room is arranged in a rear portion of the cab 6. Provided in the cab 6 are a seat on which a worker (operator) is to sit, and operating members to operate various components of the hydraulic excavator. The worker operates the operating members in the cab 6 to drive each component in order to conduct work such as excavation work, ground leveling work, and the like.

The engine room contains various kinds of equipment such as an engine 1 serving as a power source, a hydraulic pump 2 and the like. In a rear portion of the engine room, a counterweight is mounted to keep balance of the bodywork during work. A front working device 5 is attached to the right side of the front portion of the upperstructure 4.

The front working device 5 includes a plurality of front members, specifically, a boom 8, an arm 10 and a bucket 12. The boom 8 has a proximal end attached to the front portion of the upperstructure 4 to rotate about a shaft 14. The arm 10 has one end attached rotatably about a shaft 15 at a distal end of the boom 8. The boom 8 and the arm 10 are raised/lowered by being driven respectively by a boom cylinder 9 and an arm cylinder 11. The bucket 12 is attached vertically rotatably with respect to the arm 10 about a shaft 16 at a distal end of the arm 10, and is driven by a bucket cylinder 13.

The hydraulic pump 2 is connected to the engine 1, and is driven by the engine 1 to discharge hydraulic oil. The hydraulic oil discharged from the hydraulic pump 2 is supplied, via a control valve which is not shown, to each of actuators driving the front working device 5 (the boom cylinder 9, arm cylinder 11 and bucket cylinder 13), a swing hydraulic motor (not shown) driving the slewing ring 7, and the travel hydraulic motors 3m driving the undercarriage 3. That is, the hydraulic pump 2 is driven by the engine 1, and thus pressure oil is supplied from the hydraulic pump 2 to each actuator, so that the undercarriage 3, upperstructure 4 and front working device 5 are each driven.

Figure 2:
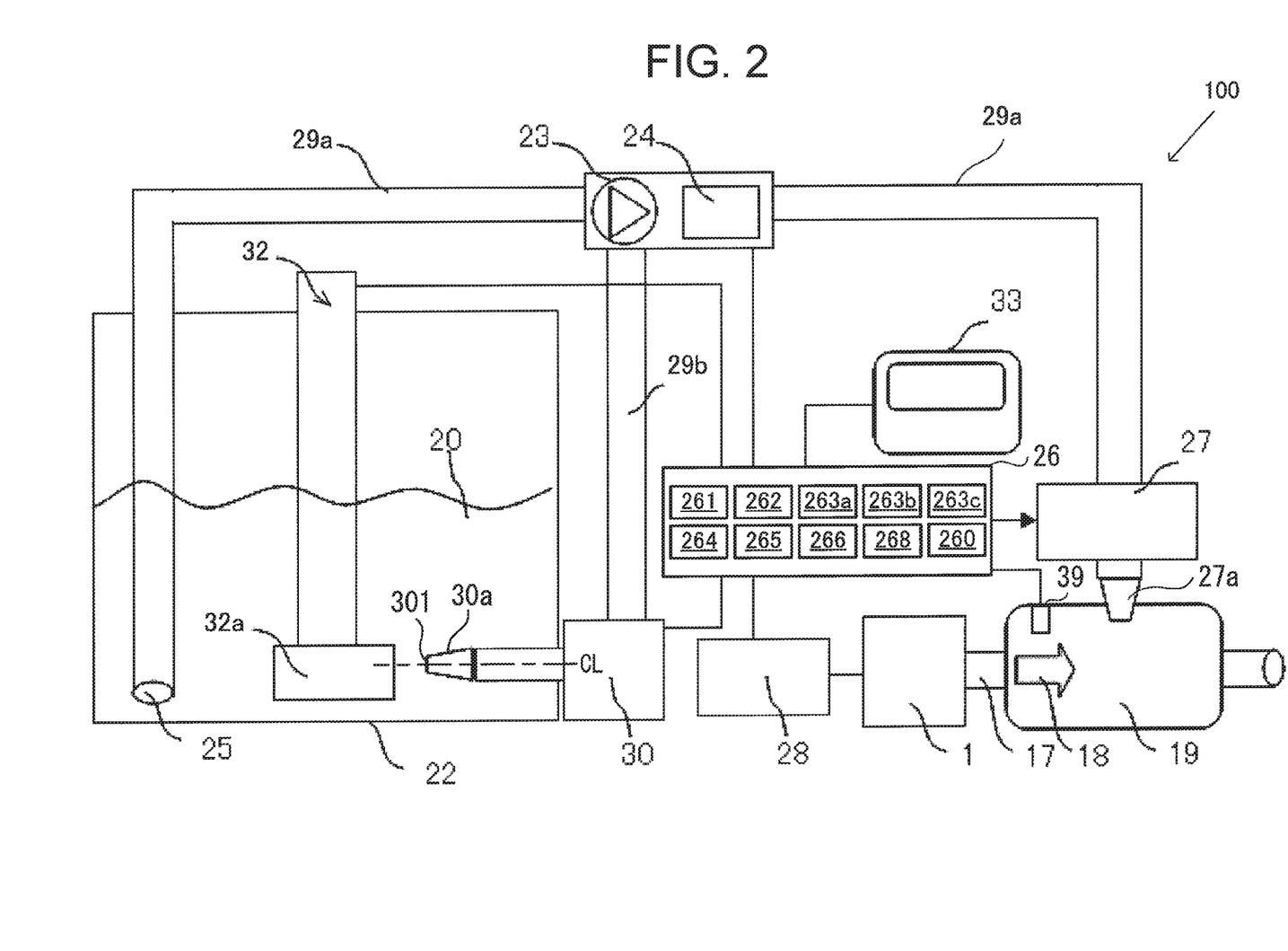
FIG. 2 is a diagram illustrating the configuration of the exhaust gas purifying device according to the first embodiment.

The upperstructure 4 is mounted with an exhaust gas purifying device 100 to remove nitrogen oxides (NOx) in the exhaust gas. FIG. 2 is a diagram illustrating the configuration of the exhaust gas purifying device 100 according to the first embodiment. The exhaust gas purifying device 100 includes: a NOx purifying device 19 placed in an exhaust flow passage of exhaust gas from the engine 1; a urea water tank 22 as a storage unit; a urea water pump 23 as a reducing agent pump; a urea water injector 27 as a reducing agent injector; an air-bubble removal device 30; and a controller 26 as an air-bubble control device.

The NOx purifying device 19 is a device including a reduction catalyst using urea water to reduce and purify nitrogen oxides (NOx) contained in exhaust gas 18 discharged from an exhaust hole 17 of the engine 1. The NOx purifying device 19 is configured, for example, to place urea SCR (Selective Catalytic Reduction) as a selective reduction catalyst on the upstream side in a cylindrical body, and to place an oxidation catalyst on the downstream side of the urea SCR. The NOx purifying device 19 is provided with a NOx sensor 39 to detect the concentration of NOx.

The urea water injector 27 is placed upstream of the urea SCR, and includes an injection valve (hereinafter referred to as a "first injection valve 27a") to inject the urea water toward the urea SCR. The first injection valve 27a is connected to the urea water tank 22 through first piping 29a forming a first flow passage in which the urea water flows. The urea water tank 22 is a container (storage unit) for storing urea water 20 which is a reducing agent. The urea water pump 23 is disposed on the first piping 29a. As described later, the rotational speed of the urea water pump 23 is controlled based on a control signal from the controller 26 so that the urea water pump 23 delivers the urea water 20 in the urea water tank 22 to the urea water injector 27. Within the urea water tank 22, a sensing part 32a of a concentration sensor 32 is placed to detect a urea water concentration C. Within the urea water tank 22, further, a float liquid level gauge (not shown) is placed to measure a liquid level (i.e., remaining amount) of the urea water 20.

In the first injection valve 27a, passing an electric current through a coil causes magnetic flux to be produced in a magnetic circuit including a movable element and a core, so that a magnetic attraction force acts to attract the movable element toward the core to close/open the valve body. The first injection valve 27a has a similar configuration to that of a well-known electromagnetically driven fuel injection valve.

The first invention valve 27a injects the urea water into the exhaust flow passage in response to a control signal from the controller 26. The controller 26 generates a signal for controlling the closing/opening of the first injection valve 27a on the basis of a detection signal from the NOx sensor 39. Upon injection of the urea water, ammonia is formed from the urea water by the urea SCR of the NOx purifying device 19, and thus NOx in the exhaust gas undergoes a reduction reaction with the ammonia, which is then decomposed into water and nitrogen. It is noted that the ammonia in the exhaust gas is reduced by the oxidation catalyst placed downstream of the urea SCR of the NOx purifying device 19.

The first piping 29a on the discharge side of the urea water pump 23 is connected to second piping 29b forming a second flow passage in which the urea water flows, so that the urea water pump 23 is connected to the air-bubble removal device 30 through the second piping 29b. Specifically, the piping on the discharge side of the urea water pump 23 is branched to be connected respectively to the urea water injector 27 and the air-bubble removal device 30. It is noted that, although not shown, return piping with throttle is connected to the urea water pump 23 and the urea water tank 22 so that surplus urea water is returned to the urea water tank 22 though the return piping.

Figure 3:
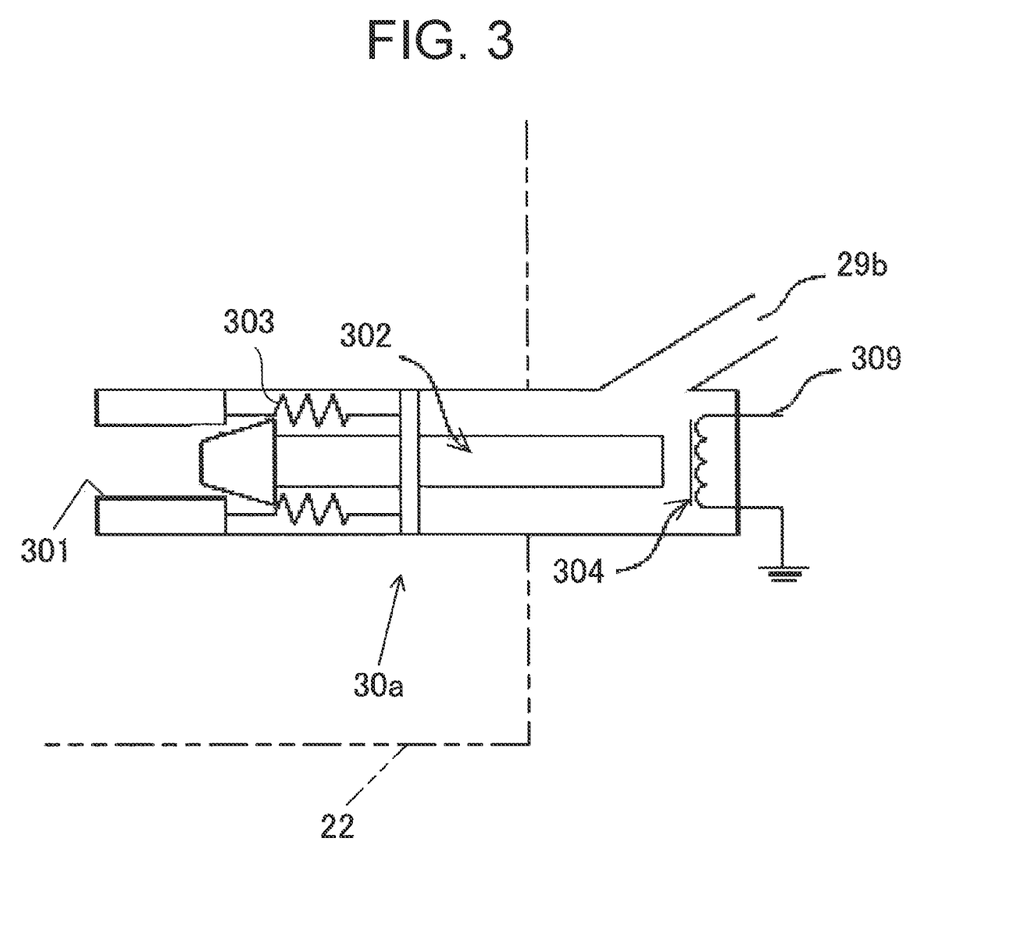
FIG. 3 is a schematic diagram illustrating the configuration of a second injection valve.

The air-bubble removal device 30 includes an injection valve (hereinafter referred to as a "second injection valve 30a") connected to the urea water tank 22 thorough the first piping 29a and the second piping 29b. FIG. 3 is a schematic diagram illustrating the configuration of the second injection valve 30a. As illustrated in FIG. 3, the second injection valve 30a is an electromagnetic injection valve, and includes: a cylindrical body into which the urea water is introduced from the second piping 29b; a valve body 302 to close/open an injection port 301 of the cylindrical body; a pulling coil spring 303 to pull the valve body 302 toward the injection port 301; and an electromagnet 304 to produce a magnetic force to move the valve body 302 against a pulling force of the pulling coil spring 303.

The valve body 302 is a long-axis member, which is placed within the cylindrical body in an axially reciprocable manner. The electromagnet 304 includes a coil and a magnetic core, in which the coil is connected to the controller 26 via a control terminal 309. Upon passage of an electric current through the coil of the electromagnet 304, the magnetic force attracts the valve body 302, so that the valve body 302 moves toward the electromagnet 304. The valve body 302 is operated by the pulling force of the pulling coil spring 303 and the magnetic force that moves the valve body 302 against the pulling force in order to control the opening/closing of the injection port 301.

The second injection valve 30a injects the urea water into the urea water tank 22 in response to a control signal (excitation current) from the controller 26. As illustrated in FIG. 2, the injection port 301 of the second injection valve 30a is placed to be directed toward the sensing part 32a of the concentration sensor 32 such that air bubbles adhering to the sensing part 32a of the concentration sensor 32 are removed by the urea water injected through the second injection valve 30a. In the present embodiment, the sensing part 32a of the concentration sensor 32 is located on the center axis CL of the valve body 302.

The urea water pump 23 is an electric operated pump, which is driven by electric power supplied in association with startup of the engine 1. After the urea water pump 23 is driven, the urea water 20 in the urea water tank 22 is drawn up from a urea water inlet 25 of the first piping 29a located within the urea water tank 22, to be supplied into the first piping 29a and the second piping 29b and pressurized. The urea water in the first piping 29a on the discharge side of the urea water pump 23 is injected and supplied into the exhaust flow passage of the engine 1 by opening the first injection valve 27a. The urea water in the second piping 29b is injected and supplied into the urea water tank 22 by opening the second injection valve 30a.

In the first piping 29a on the discharge side of the urea water pump 23, a pressure sensor 24 is placed to detect a discharge pressure Pp of the urea water pump 23. The discharge pressure Pp detected by the pressure sensor 24 is used to determine whether or not a required amount of urea water can be injected through the first injection valve 27a. The first injection valve 27a is opened when the condition that at least the discharge pressure Pp is equal to or greater than a predetermined value is satisfied.

The controller 26 is configured to include CPU, and ROM and RAM which are memory devices, as well as an arithmetic processing unit having other peripheral circuits and/or the like. A display device 33 is connected to the controller 26. The display device 33 is a display device such as, e.g., a liquid crystal monitor or the like, which displays a display image on a display screen on the basis of a control signal from the controller 26.

The controller 26 is connected to an engine controller 28 that controls the engine 1. As described later, when either a state in which the urea water concentration C is less or greater than a predetermined threshold or a state in which the liquid level of the urea water in the urea water tank 22 is less than a predetermined threshold (i.e., a urea water deficient state) is maintained for a predetermined time period, the controller 26 outputs a control signal indicative of satisfaction of the condition for limiting the output of the engine 1, to the engine controller 28. The engine controller 28 limits the output of the engine 1 on the basis of the control signal from the controller 26.

The pressure sensor 24 is connected to the controller 26 which receives, as input, a signal corresponding to the discharge pressure Pp of the urea water pump 23 which has been detected by the pressure sensor 24. The sensing part 32a of the concentration sensor 32 is connected to the controller 26 which receives, as input, a signal corresponding to the urea water concentration C which has been detected by the sensing part 32a of the concentration sensor 32. The NOx sensor 39 is also connected to the controller 26 which receives, as input, a signal corresponding to the NOx concentration detected by the NOx sensor 39.

In the present embodiment, a sound velocity measurement type concentration sensor is employed as the concentration sensor 32. The sound velocity measurement concentration sensor includes a sensing part in which an ultrasonic transducer is placed opposite a reflector. By measuring the time elapsed until ultrasound transmitted from the ultrasonic transducer returns from the reflector, a sound velocity v is measured. That is, the signal corresponding to the urea water concentration C detected by the concentration sensor 32 is a signal indicative of the sound velocity v. It is noted that the round-trip time of the ultrasound may be used in lieu of the sound velocity v.

The memory device of the controller 26 has pre-stored therein a data table indicating the correlation between the sound velocity v and the urea water concentration C (hereinafter referred to as a "concentration data table"). The controller 26 looks up the concentration data table to compute the urea water concentration C on the basis of the measured sound velocity v. It is noted that if the amount of the urea water 20 stored in the urea water tank 22 becomes smaller, that is, the liquid level is lowered, to expose the sensing part 32a of the concentration sensor 32 to air, the value of the detected sound velocity v is a lower level than the case of the urea water. However, a concentration data table corresponding to the sound velocity v in air is not stored in the memory device of the controller 26. Therefore, in this event, the controller 26 determines that an invalid value is input.

Here, if air bubbles exist between the ultrasonic transducer and the reflector because of, e.g., the adhesion of air bubbles to the ultrasonic transducer and/or the reflector which form the sensing part 32a, a correct measurement result cannot be obtained and a false detection of a concentration anomaly may occur. To avoid this, in the present embodiment, the air bubbles adhering to the sensing part 32a of the concentration sensor 32 are removed by the air-bubble removal device 30. The following is a description of the function of the controller 26 to control the driving of the air-bubble removal device 30.

The controller 26 functionally includes a pump control section 261, a concentration state determination section 262, an air determination counter 263a, an upper-limit determination counter 263b, a lower-limit determination counter 263c, an injection timer setting section 264, a static standby timer setting section 265, a display control section 266, an injection condition determination section 268 and an output limiting determination section 260.

The pump control section 261 controls the rotational speed of the urea water pump 23 such that the discharge pressure Pp of the urea water is maintained constant at a predetermined pressure Pp1 previously specified. When the discharge pressure Pp falls within a predetermined range including the predetermined pressure Pp1 (Pp1a≤Pp≤Pp1b), the pump control section 261 does not change the rotational speed of the urea water pump 23. When the discharge pressure Pp falls below the predetermined range (Pp<Pp1a), the pump control section 261 increases the rotational speed of the urea water pump 23, whereas when the discharge pressure Pp exceeds the predetermined range (Pp1$b$<Pp), the pump control section 261 decreases the rotational speed of the urea water pump 23. It is noted that, if the output of the engine 1 is limited, the pump control section 261 stops the urea water pump 23.

The concentration state determination section 262 determines whether or not a pre-specified amount of urea water is stored in the urea water tank 22, and also whether or not the concentration C of the urea water stored in the urea water tank 22 falls within a normal range, i.e., whether or not the concentration C is equal to or greater than a lower limit value Cn and less than an upper limit value Cx (Cn≤C<Cx). The urea water concentration C has a bearing on the purification performance of nitrogen oxides (NOx); in low concentrations, nitrogen oxides (NOx) cannot be sufficiently decomposed, whereas in higher concentrations, the urea water injected excessively may turn to ammonia which then may escape to the outside. Further, if the shortage (deficiency) of the urea water makes it impossible to supply the urea water to the urea water SCR, the nitrogen oxides (NOx) become incapable of being purified. Accordingly, the accuracy is required for the result of measurements of the urea water concentration C achieved by the concentration state determination section 262. The following is a detailed description about specific determination contents of the concentration state determination section 262 and the processing based on the determination result.

The concentration state determination section 262 looks up the concentration data table stored in the memory device in order to calculate the urea water concentration C on the basis of the value (sound velocity v) detected by the sensing part 32$a$ of the concentration sensor 32.

The concentration state determination section 262 determines whether or not the value v detected by the sensing part 32$a$ of the concentration sensor 32 is less than a threshold v1 for air determination. The air determination threshold v1 corresponds to the lower limit value of the sound velocity v in the concentration data table. Put another way, the concentration state determination section 262 determines whether or not the value v detected by the concentration sensor 32 is less than the lower limit value in the concentration data table. If it is determined that the detected value v is less than the air determination threshold v1, i.e., when the concentration data table is looked up, if it is determined that the detected value v is less than the lower limit value in the concentration data table, the concentration state determination section 262 determinates that the detected value v is an invalid value.

Subsequent to the determination that the value v detected by the concentration sensor 32 is an invalid value, the concentration state determination section 262 determines whether or not a counter value ia of the air determination counter 263$a$ is equal to or greater than a threshold ia0. If the counter value ia is at or above the threshold ia0, the concentration state determination section 262 declares "anomaly (deficient state)".

Where the concentration state determination section 262 determines that the counter value ia is less than the threshold ia0 (ia<ia0), the air determination counter 263$a$ increments the counter value ia every control cycle (ia=ia+1). The threshold ia0 is a value corresponding to a period of time on the order of a few minutes to ten minutes, which is pre-stored in the memory device. If it is determined that the value v detected by the concentration sensor 32 is not an invalid value, the air determination counter 263$a$ clears the counter value ia (ia=0).

The concentration state determination section 262 determines whether or not the urea water concentration C computed based on the value v detected by the concentration sensor 32 is equal to or greater than the upper limit value Cx. The upper limit value Cx is set (e.g., the order of 50%) in order to prevent precipitation of urea as crystals in the urea water and to prevent the concentration from becoming a level rendering the urea water susceptible to freezing within the operating temperature range, which is pre-stored in the memory device.

If it is determined that the urea water concentration C is equal to or greater than the upper limit value Cx (C Cx), the concentration state determination section 262 determines whether or not a counter value ib of the upper-limit determination counter 263$b$ is equal to or greater than a threshold ib0. If the counter value ib is at or above the threshold ib0, the concentration state determination section 262 declares "anomaly (high concentration state)".

Where the concentration state determination section 262 determines that the counter value ib is less than the threshold ib0 (ib<ib0), the upper-limit determination counter 263$b$ increments the counter value ib every control cycle (ib=ib+1). The threshold ib0 is a value corresponding to a period of time on the order of a few minutes to ten minutes, which is pre-stored in the memory device. If it is determined that the value v detected by the concentration sensor 32 is less than the upper limit value Cx, the upper-limit determination counter 263$b$ clears the counter value ib (ib=0).

The concentration state determination section 262 determines whether or not the urea water concentration C computed based on the value v detected by the concentration sensor 32 is less than the lower limit value Cn. The lower limit value Cn is set (e.g., the order of 25%) in order to prevent exhaust gas from being unable to be effectively purified within the operating temperature range, which is pre-stored in the memory device.

If it is determined that the urea water concentration C is less than the lower limit value Cn (C<Cn), the concentration state determination section 262 determines whether or not a counter value ic of the lower-limit determination counter 263$c$ is at or above a threshold ic0. If the counter value ic is at or above the threshold ic0, the concentration state determination section 262 declares "anomaly (low concentration state)".

Where the concentration state determination section 262 determines that the counter value ic is below the threshold ic0 (ic<ic0), the lower-limit determination counter 263$c$ increments the counter value ic every control cycle (ic=ic+1). The threshold ic0 is a value corresponding to a period of time on the order of a few minutes to ten minutes, which is pre-stored in the memory device. If it is determined that the concentration C detected by the concentration sensor 32 is equal to or greater than the lower limit value Cn, the lower-limit determination counter 263$c$ clears the counter value ic (ic=0).

It is noted that the concentration state determination section 262 declares "normal" if any of the above-described "anomaly (deficient state)", "anomaly (high concentration state)" and "anomaly (low concentration state)" is not applied.

The display control section 266 selects a display image corresponding to the result determined by the concentration state determination section 262, from among display images stored in the memory device, and then causes the display device 33 to display the display image on the display screen. Where the determination result in the concentration state determination section 262 is "normal", the display control section 266 causes the display device 33 to display a display image representing the urea water in normal state.

Where the determination result of the concentration state determination section 262 is "anomaly (deficient state)" (V<V1, is ia0), the display control section 266 causes the display device 33 to display a "deficiency error" display image on the display screen as information indicating that the liquid level of the urea water in the urea water tank 22 is not enough to expose the sensing part 32*a* of the concentration sensor 32 to air.

Where the determination result of the concentration state determination section 262 is "anomaly (high concentration state)" (C≥Cx, ib≥ib0), the display control section 266 causes the display device 33 to display a "high-concentration error" display image on the display screen as information indicating that the urea water is in the high concentration state.

Where the determination result of the concentration state determination section 262 is "anomaly (low concentration state)" (C<Cn, ic≥i0), the display control section 266 causes the display device 33 to display a "low-concentration error" display image on the display screen as information indicating that the urea water is in the low concentration state.

Where "anomaly (deficient state, high concentration state or low concentration state)" is determined by the concentration state determination section 262, the output limiting determination section 260 outputs a control signal to the engine controller 28 to limit the output of the engine 1. The engine controller 28 limits the output of the engine 1 according to anomaly conditions. It is noted that, where "normal" is determined by the concentration state determination section 262, the output limiting determination section 260 generates no control signal to limit the output of the engine 1.

Based on the counter value ia of the air determination counter 263*a*, the counter value ib of the upper-limit determination counter 263*b* and the counter value ic of the lower-limit determination counter 263*c*, the injection condition determination section 268 determines whether or not the injection condition is met. Where all the counter values ia, ib, ic are not equal to or less than zero, i.e., where at least any one of the counter values ia, ib, ic exceeds zero, the injection condition determination section 268 determines that the injection condition is met. Where all the counter values ia, ib, ic are equal to or less than zero, the injection condition determination section 268 determines that the injection condition is not met.

Upon the injection condition determination section 268 determining that the injection condition is met, the injection timer setting section 264 sets a timer value corresponding to an injection time (hereinafter referred to as an "injection timer value Ti") to a set value Ti1 pre-stored in the memory device (Ti=Ti1). The set value Ti1 is predefined as a period of time to allow removal of air bubbles (e.g., the order of 30 seconds) by experiment and/or the like. The injection timer setting section 264 decrements the injection timer value Ti set every predetermined control cycle (Ti=Ti−1).

Upon satisfaction of the injection condition, the static standby timer setting section 265 sets a timer value corresponding to a static standby time (hereinafter referred to as a "static standby timer value Ts") to a set value Ts' pre-stored in the memory device (Ts=Ts1). The set value Ts' is the standby time after completion of a urea water injection from the second injection valve 30*a* of the air-bubble removal device 30. In the present embodiment, after the detection values at the concentration sensor 32 are measured for a predetermined time period (e.g., the order of 30 seconds), the averaging processing is performed every predetermined control cycle. That is, the filtering processing is performed for reduction in noise. Because of this, even after the air bubbles are removed from the sensing part 32*a* of the concentration sensor 32 by the urea water injection, the concentrations C detected before the removal of air bubbles and during the urea water injection are used in the averaging. To address this, for detection of a correct concentration C, the set value Ts' is defined as a time (e.g., the order of 30 seconds to one minute) equal to or longer than the time required for the averaging.

In the present embodiment, upon the injection condition being met and the air-bubble removal device 30 starting injection, the static standby timer setting section 265 sets the static standby timer value Ts to the set value Ts1. Then, after completion of the injection by the air-bubble removal device 30, the static standby timer setting section 265 decrements the static standby timer value Ts every predetermined control cycle (Ts=Ts−1).

Figure 4:
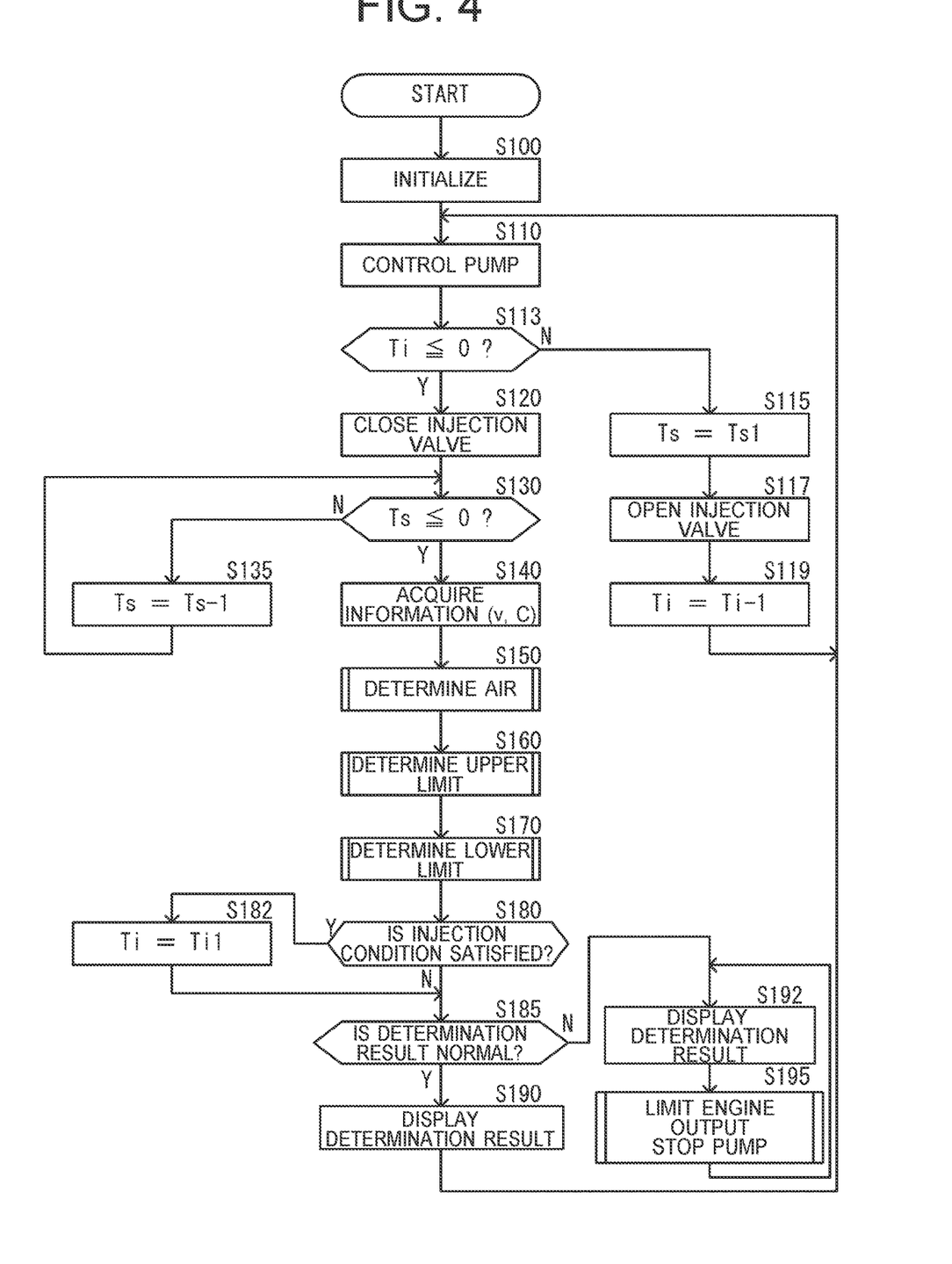
FIG. 4 is a flowchart illustrating example processing by an air-bubble removal program executed by a controller according to the first embodiment.
Figure 5A:
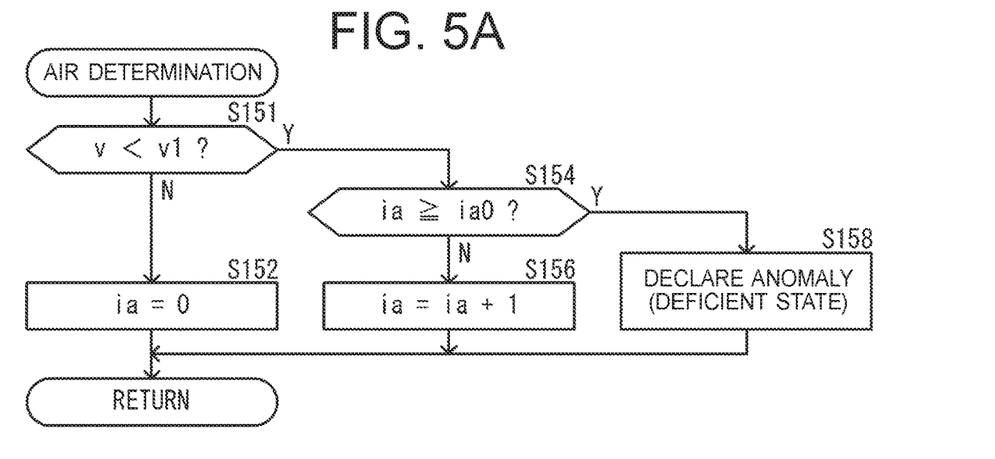
FIG. 5 is flowcharts illustrating the air determination processing, upper-limit determination processing and lower-limit determination processing in FIG. 4, by way of instance.
Figure 5B:
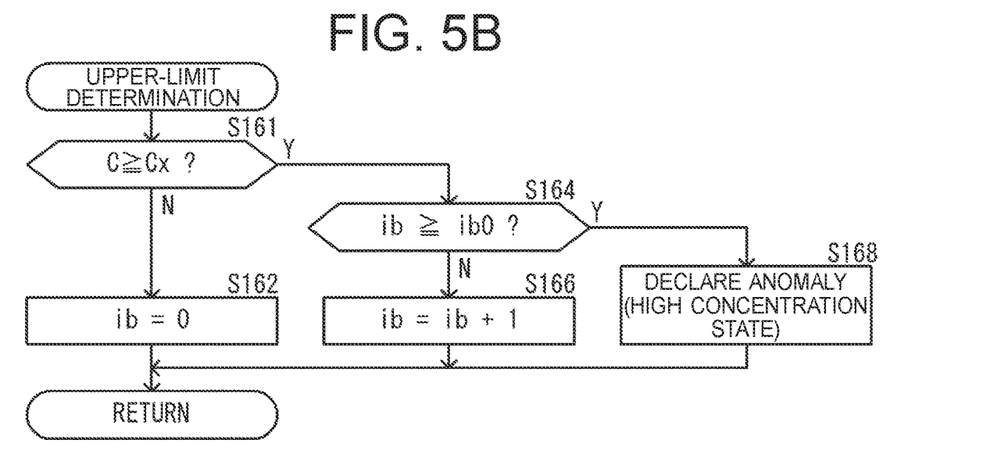
Figure 5C:
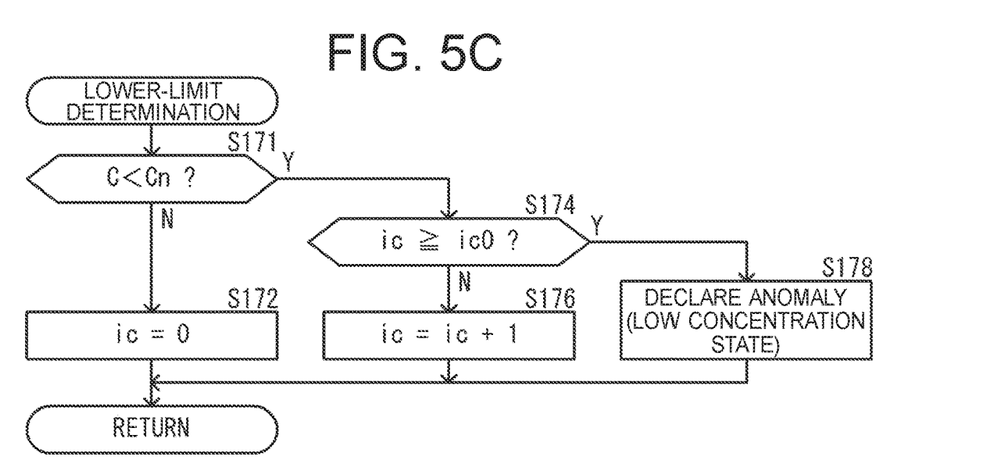

FIG. 4 is a flowchart illustrating example processing by an air-bubble removal program executed by the controller 26 according to the first embodiment. FIG. 5 is flowcharts illustrating the air determination processing, upper-limit determination processing and lower-limit determination processing in FIG. 4, by way of example. The processing shown in the flowchart in FIG. 4 starts by turning on the ignition switch, and after execution of initialization (Step S100), the processing steps from Step S110 onward are repeated every predetermined control cycle.

At Step S100, the controller 26 performs the initialization processing and proceeds to Step S110. In the initialization processing (S100), the counter values ia, ib, is are set to zero, and the injection timer value Ti and the static standby timer value Ts are set to zero.

In Step S110, the controller 26 reads a discharge pressure Pp of the urea water pump 23, and outputs a control signal to control the rotational speed of the urea water pump 23 such that the discharge pressure Pp of the urea water pump 23 can be maintained constant at a predetermined pressure Pp1. Then, the controller 26 proceeds to Step S113.

In Step S113, the controller 26 determines whether or not the injection timer value Ti is equal to or less than zero. If the determination in Step S113 is affirmative, the controller 26 proceeds to Step S120, but if the determination in Step S113 is negative, the controller 26 proceeds to Step S115.

In Step S115, the controller 26 sets the static standby timer value Ts to the set value Ts1, and then proceeds to Step S117. In Step S117, the controller 26 outputs an open signal to the second injection valve 30*a* of the air-bubble removal device 30 to open the second injection valve 30*a*, and then proceeds to Step S119. In Step S119, the controller 26 decrements the injection timer value Ti (Ti=Ti−1), and then goes back to Step S110.

In Step S120, the controller 26 outputs a close signal to the second injection valve 30*a* of the air-bubble removal device 30 to close the second injection valve 30*a*, and then proceeds to Step S130.

In Step S130, the controller 26 determines whether or not the static standby timer value Ts is equal to or less than zero. If the determination in Step S130 is negative, the controller 26 proceeds to Step S135, but if the determination in Step S130 is affirmative, the controller 26 proceeds to Step S140. In Step S135, the controller 26 decrements the static standby timer value Ts (Ts=Ts−1), and then goes back to Step S130.

In Step S140, the controller 26 reads a value (sound velocity v) detected by the concentration sensor 32, and acquires a urea water concentration C calculated from the sound velocity v. Then, the controller 26 proceeds to Step S150 to execute the air determination processing illustrated in FIG. 5(*a*). In Step S151, the controller 26 determines whether or not the value (sound velocity v) detected by the concentration sensor 32 is less than an air determination threshold v1. If the determination in Step S151 is negative, the controller 26 proceeds to Step S152, but if the determination in Step S151 is affirmative, the controller 26 proceeds to Step S154.

In Step S152, the controller 26 clears the counter value ia (ia=0), and then returns to the main routine (see FIG. 4). In Step S154, the controller 26 determines whether or not the counter value ia is equal to or greater than a threshold ia0. If the determination in Step S154 is negative, the controller 26 proceeds to Step S156, but if the determination in Step S154 is affirmative, the controller 26 proceeds to Step S158.

In Step S156, the controller 26 increments the counter value ia (ia=ia+1), and then returns to the main routine (see FIG. 4). In Step S158, the controller 26 declares "anomaly (deficient)", and then returns to the main routine (see FIG. 4).

Step S160 follows (see FIG. 4) completion of the air determination processing (Step S150), and the upper-limit determination processing illustrated in FIG. 5(*b*) is executed. In Step S161, the controller 26 determines whether or not the urea water concentration C acquired in Step S140 (see FIG. 4) is equal to or greater than an upper limit value Cx. If the determination in Step S161 is negative, the controller 26 proceeds to Step S162, but if the determination in Step S161 is affirmative, the controller 26 proceeds to Step S164.

In Step S162, the controller 26 clears the counter value ib (ib=0), and then returns to the main routine (see FIG. 4). In Step S164, the controller 26 determines whether or not the counter value ib is equal to or greater than a threshold ib0. If the determination in Step S164 is negative, the controller 26 proceeds to Step S166, but the determination in Step S164 is affirmative, the controller 26 proceeds to Step S168.

In Step S166, the controller 26 increments the counter value ib (ib=ib+1), and then returns to the main routine (see FIG. 4). In Step S168, the controller 26 declares "anomaly (high concentration state)", and then returns to the main routine (see FIG. 4).

Step S170 follows (see FIG. 4) completion of the upper-limit determination processing (Step S160), and the lower-limit determination processing illustrated in FIG. 5(*c*) is executed. In Step S171, the controller 26 determines whether or not the urea water concentration C acquired in Step S140 (see FIG. 4) is less than a lower limit value Cn. If the determination in Step S171 is negative, the controller 26 proceeds to Step S172, but if the determination in Step S171 is affirmative, the controller 26 proceeds to Step S174.

In Step S172, the controller 26 clears the counter value ic (ic=0), and then returns to the main routine (see FIG. 4). In Step S174, the controller 26 determines whether or not the counter value ic is equal to or greater than a threshold ic0. If the determination in Step S174 is negative, the controller 26 proceeds to Step S176, but if the determination in Step S174 is affirmative, the controller 26 proceeds to Step S178.

In Step S176, the controller 26 increments the counter value ic (ic=ic+1), and then returns to the main routine (see FIG. 4). In Step S178, the controller 26 declares "anomaly (low concentration state)", and then returns to the main routine (see FIG. 4).

As illustrated in FIG. 4, Step S180 follows completion of the lower-limit determination processing (Step S170), and, in Step S180, the controller 26 determines whether or not the injection condition is met. If the determination in Step S180 is affirmative, the controller 26 proceeds to Step S182, but if the determination in Step S180 is negative, the controller 26 proceeds to Step S185. In Step S182, the controller 26 sets the injection timer value Ti to the set value Ti1, and proceeds to Step S185.

In Step S185, the controller 26 determines, based on the determination results in Steps S150, S160, S170, whether or not the state is "normal". When the determination result does not show any of "anomaly (deficient state)", "anomaly (high concentration state)" and "anomaly (low concentration state)", the controller 26 determines that the urea water in the urea water tank 22 is in "normal" state. If an affirmative determination is made, i.e., the "normal" state is determined in Step S185, the controller 26 proceeds to Step S190. If a negative determination is made, i.e., an "anomaly" state is determined in Step S185, the controller 26 proceeds to Step S192.

In Step S190, the controller 26 causes the display device 33 to display the determination result, i.e., a display image corresponding to "normal", on the display screen, and then the controller 26 returns to Step S110. In Step S192, the controller 26 causes the display device 33 to display the determination result, i.e., a display image corresponding to any one of "anomaly (deficient state)", "anomaly (high concentration state)" and "anomaly (low concentration state)", and then the controller 26 proceeds to Step S195.

In Step S195, the controller 26 generates a control signal to limit the output of the engine 1, and outputs the control signal to the engine controller 28. Further, the controller 26 outputs, to the urea water pump 23, a control signal for stopping the urea water pump 23. It is noted that the engine output limiting processing is terminated when replacement of the urea water in the urea water tank 22, or the like, is made to allow the urea water concentration C falls within the normal range (Cn≤C<Cx) and then a serviceperson or the like operates a not-shown cancelling switch to reset the system.

The operation in the present embodiment is summarized as follows. An operator turns on the ignition switch, whereupon the urea water pump 23 starts and the discharge pressure Pp of the urea water pump 23 is controlled to become constant at a predetermined pressure (S110). The concentration C in the urea water tank 22 is monitored at all times by the controller 26. If the urea water concentration C falls within the normal range, specifically, is equal to or greater than the lower limit value Cn and less than the upper limit value Cx (Cn≤C<Cx), display indicating the normal state appears on the display screen of the display device 33 (S190).

Here, assuming that, resulting from adhesion of air bubbles to the sensing part 32*a* of the concentration sensor 32, a detection result of the concentration sensor 32 falls outside the normal range (Cn≤C<Cx). In this event, the injection timer value Ti is set to the set value Ti1 corresponding to a predetermined injection time (e.g., the order of 30 seconds) (Yes in S180→S182), then the second injection valve 30*a* of the air-bubble removal device 30 is opened, so that the urea water is injected from the second injection valve 30*a* toward the sensing part 32*a* of the concentration sensor 32 only during the predetermined injection time (No in S113→S117, S119).

After the injection condition has been satisfied, the static standby timer value Ts is set to the set value Ts' corresponding to a static standby time (e.g., the order of 30 seconds to one minute) (S115). Because of this, the air bubbles adhering to the sensing part 32*a* of the concentration sensor 32 is removed by a jet flow from the second injection valve 30*a*, and then the second injection valve 30a of the air-bubble removal device 30 is closed (S120). Then, during the predetermined static standby time, the detection of the concentration C is paused and the air-bubble removal device 30 performs no injection of the urea water (No in S130→S135→No in S130→S135 . . . ).

After the urea water has been injected into the urea water tank 22, when the conditions within the urea water tank 22 become static, the concentration sensor 32 restarts detecting the urea water concentration C (Yes in S130).

It is noted that if, resulting from adhesion of air bubbles to the sensing part 32a of the concentration sensor 32, a detection result of the concentration sensor 32 falls outside the normal range (Cn≤C<Cx), any action is not immediately taken, such as displaying of a warning image of any one of "deficiency error", "high concentration error" and "low concentration error" on the display screen of the display device 33, or limiting of the output of the engine 1 (No in S154, No in S164 or No in S174).

After the air bubbles are removed by the air-bubble removal device 30 and the urea water concentration C returns to the normal range (Cn≤C<Cx), the counter values ia, ib, is are cleared (S152, S162, S172).

If the state in which the urea water concentration C is in the high concentration state lasts for a predetermined time period, the counter value ib becomes equal to or greater than the threshold ib0, so that the "high concentration error" is displaced on the display screen of the display device 33 and also the output of the engine 1 is limited (Yes in S164→S168, No in S185→S192, S195). If the state in which the urea water concentration C is in the low concentration state lasts for a predetermined time period, the counter value is becomes equal to or greater than the threshold ic0, so that the "low concentration error" is displaced on the display screen of the display device 33 and also the output of the engine 1 is limited (Yes in S174→S178, No in S185→S192, S195).

If the state in which the liquid level of the urea water in the urea water tank 22 is lowered to expose the sensing part 32a of the concentration sensor 32 to air lasts for a predetermined time period, the counter value is becomes equal to or greater than the threshold ia0, so that the "deficiency error" is displaced on the display screen of the display device 33 and also the output of the engine 1 is limited (Yes in S154→S158, No in S185→S192, S195).

According to the aforementioned embodiment, the following advantageous effects are provided.

(1) The air-bubble removal device 30 is placed to inject urea water toward the sensing part 32a of the concentration sensor 32 that is placed within the urea water tank 22 to detect the concentration of the urea water. Because air bubbles adhering to the sensing part 32a of the concentration sensor 32 are able to be removed by the urea water being injected by the air-bubble removal device 30, a reduction in measurement accuracy of the concentration sensor 32 can be minimized.

In the conventional art, if air bubbles adhere to the sensing part 32a of the concentration sensor 32 and a value detected by the concentration sensor 32 becomes a value at which a warning image such as of a deficiency error, a high concentration error, a low concentration error or the like is displayed, that is, if a false detection of a concentration anomaly occurs, this results in display of a warning image and limiting of the engine output. In the present embodiment, because it is possible to prevent the output of the engine 1 from being limited due to a false detection of a urea water concentration anomaly, a reduction in capacity utilization of the hydraulic excavator can be prevented.

(2) As an example technique for comparison with the present embodiment, in the case where the air-bubble removal device 30 injects the urea water at regular intervals without regard for the urea water concentration C, a short time interval between injections is set in order to prevent the air bubbles to continue to adhere for a long time. This results in an increase in opportunities to inject the urea water even in circumstances where the air bubbles do not adhere to the sensing part 32a of the concentration sensor 32. By contrast, in the present embodiment, the controller 26 controls the urea water injection by the air-bubble removal device 30 on the basis of the value (the urea water concentration C) detected by the concentration sensor 32. Accordingly, injection of the urea water is able to be prevented in circumstances where the air bubbles do not adhere to the sensing part 32a of the concentration sensor 32.

(3) The second piping 29b through which the urea water discharged from the urea water pump 23 is supplied to the air-bubble removal device 30 is connected to the first piping 29a connecting the discharge side of the urea water pump 23 to the urea water injector 27. Both the urea water injection by the urea water injector 27 and the urea water injection by the air-bubble removal device 30 are able to be achieved by using the single urea water pump 23 alone. This enables reductions in component count and costs. Further, it is possible to offer additional degrees of freedom in layout of the arrangement of individual members forming the exhaust gas purifying device 100.

(4) What is required is simply to connect the second piping 29b to the first piping 29a, to mount the air-bubble removal device 30 to the urea water tank 22 and to update the control program in the controller 26. Thus, the number of additional devices can be minimized.

(5) When the value detected by the concentration sensor 32 falls outside the normal range (Cn≤C<Cx), the controller 26 causes the air-bubble removal device 30 to perform the air-bubble removing operation (open the second injection valve 30a) during a predetermined time period. When the value detected by the concentration sensor 32 still remains outside the normal range after completion of the air-bubble removing operation (after closing the second injection valve 30a), the controller 26 causes the display device 33 to display a warning image on the display screen and limits the output of the engine 1. This makes it possible to display a warning image and limit the output of the engine 1 on the basis of the urea water concentration C detected after the air bubbles have been removed, i.e., of the correct detection result.

Second Embodiment

The exhaust gas purifying device 100 according to a second embodiment will be described with reference to FIG. 6 and FIG. 7. Incidentally, in the drawings, the same reference signs refer to the same or corresponding parts/sections as those in the first embodiment, and differences are mainly described. The exhaust gas purifying device 100 according to the second embodiment has a similar configuration to the exhaust gas purifying device 100 according to the first embodiment (see FIG. 2).

In the example described in the first embodiment, based on the concentration C detected by the concentration sensor 32, the controller 26 controls the urea water injection by the air-bubble removal device 30. Meanwhile, in the second embodiment, based on the urea water discharge pressure Pp detected by the pressure sensor 24 as well as the urea water concentration C detected by the concentration sensor 32, the urea water injection by the air-bubble removal device 30 is controlled.

The liquid surface in the urea water tank 22 may be inclined or leakage may occur in the first piping 29a or the second piping 29b. If this causes air to be drawn into the urea water pump 23, the discharge pressure Pp of the urea water pump 23 decreases temporary. Under condition of the decreasing discharge pressure Pp, even if the second injection valve 30a of the air-bubble removal device 30 is opened, a sufficient jet flow cannot be produced and the air bubbles may not be removed. To address this, in the second embodiment, only when the discharge pressure Pp becomes equal to or greater than the threshold Pp0, the air-bubble removing operation (opening of the second injection valve 30a) is performed by the air-bubble removal device 30.

Figure 6:
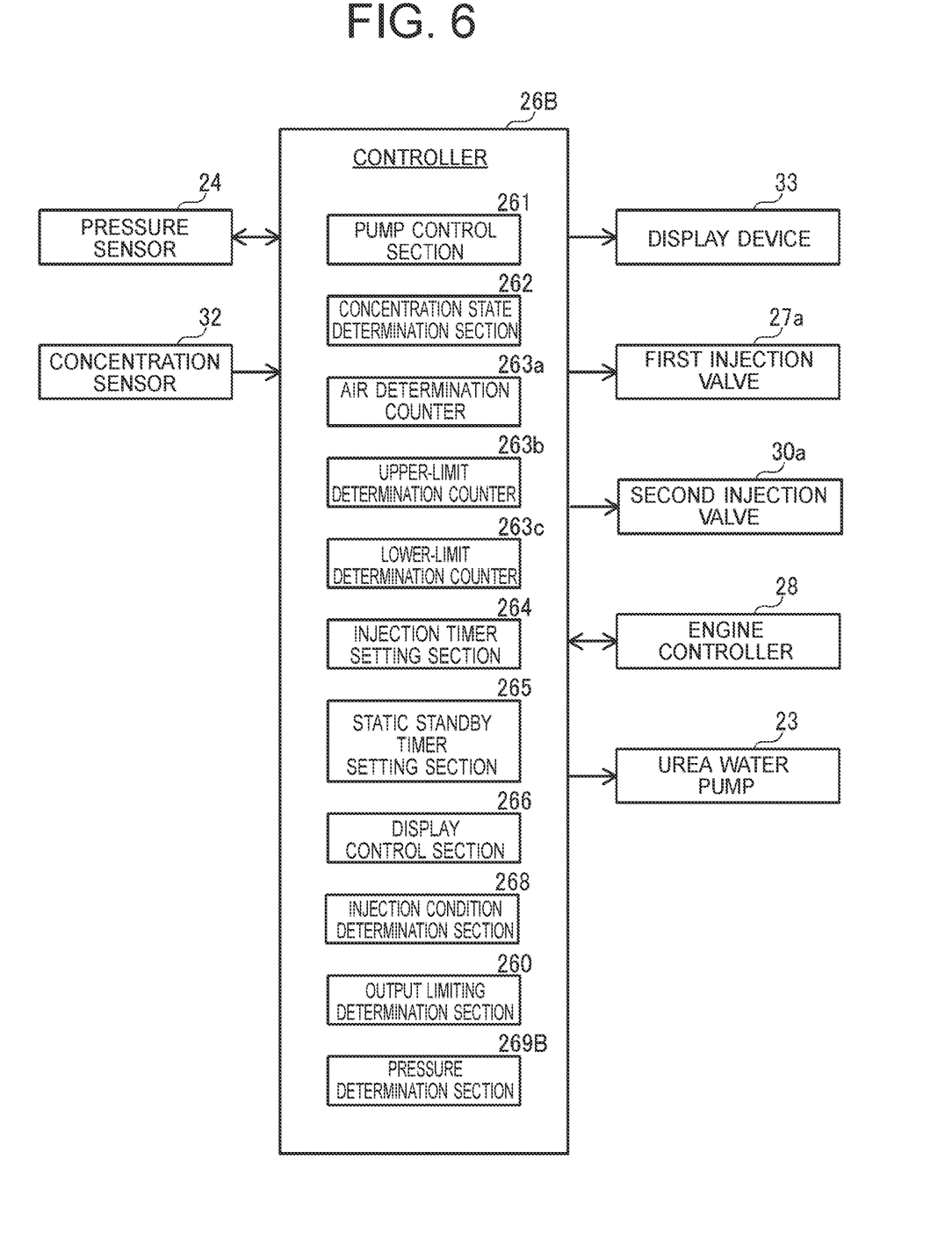
FIG. 6 is a function block diagram of a controller according to a second embodiment.

FIG. 6 is a function block diagram of a controller 26B according to the second embodiment. The controller 26B according to the second embodiment functionally includes a pressure determination section 269B in addition to the configuration described in the first embodiment (see FIG. 2).

The pressure determination section 269B determines whether or not the discharge pressure Pp of the urea water pump 23 detected by the pressure sensor 24 is at or above the threshold Pp0. If the discharge pressure Pp is at or above the threshold Pp0 (Pp≥Pp0), the pressure determination section 269B determines that a precondition for the concentration state determination is satisfied. Meanwhile, if the discharge pressure Pp is below the threshold Pp0 (Pp<Pp0), the pressure determination section 269B determines that the precondition for the concentration state determination is not satisfied. The threshold Pp0 is a lower limit value for the discharge pressure Pp in order for the urea water injection by the second injection valve 30a of the air-bubble removal device 30 to be able to remove the air bubbles. The threshold Pp0 is pre-stored in the memory device. Note that the threshold Pp0 is a value smaller than the predetermined pressure Pp1 (Pp0<Pp1).

If the precondition for the concentration state determination is not satisfied, the concentration state determination section 262 does not perform the concentration state determination processing (S150, S160, S170), but if the precondition for the concentration state determination is satisfied, the concentration state determination section 262 performs the concentration state determination processing (S150, S160, S170). If the precondition for the concentration state determination is not satisfied, the injection timer setting section 264 clears the injection timer value Ti (To=0), and sets the static standby timer value Ts to a set value Ts2 (Ts=Ts2). The set value Ti2 represents a period of time from a drop of the discharge pressure Pp to stability to the predetermined pressure Pp1, which is defined by experiment and/or the like, and pre-stored in the memory device. It is noted that the set value Ts2 may be equal to or different from the set value Ts1.

Figure 7:
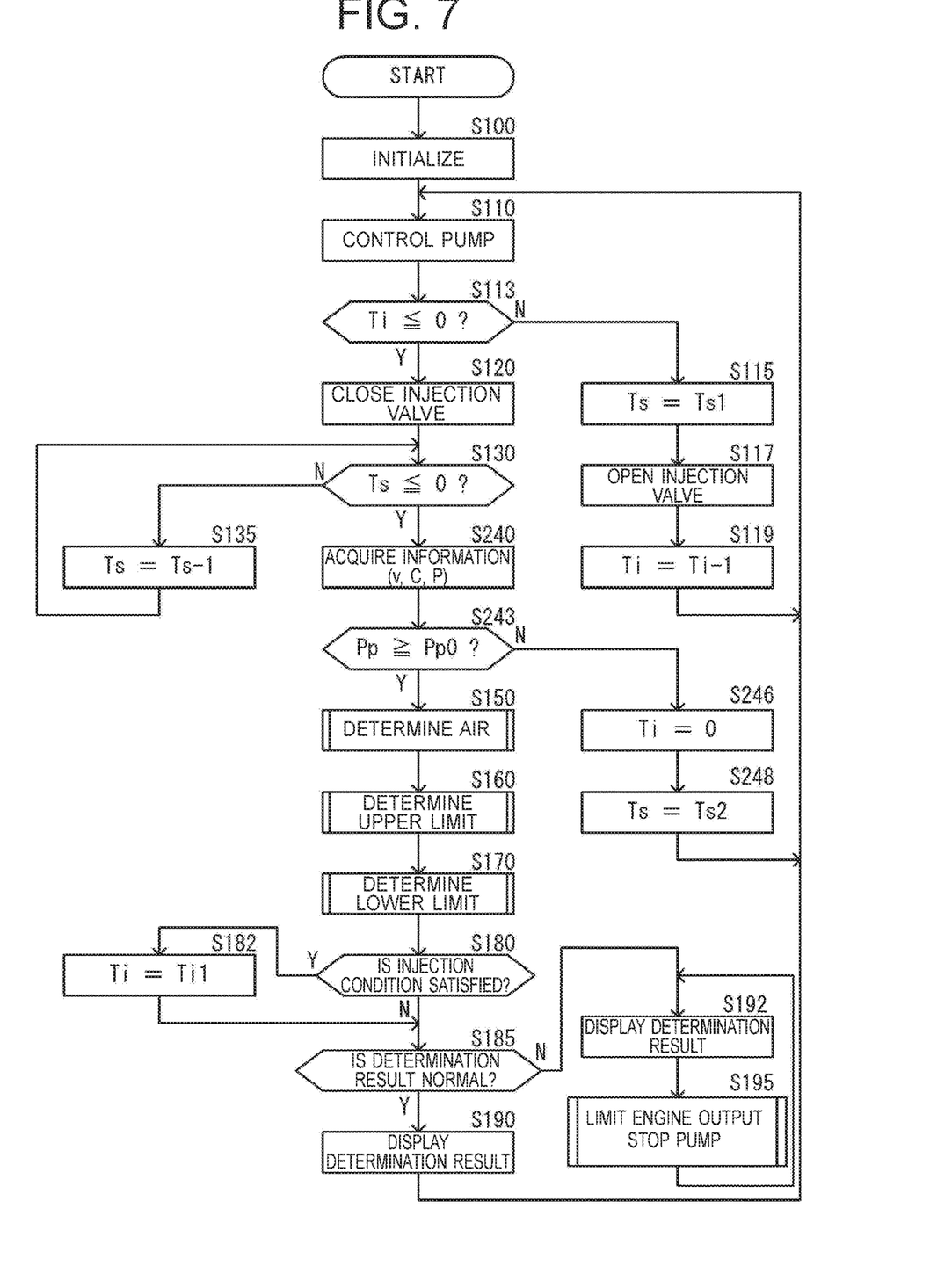
FIG. 7 is a flowchart illustrating example processing by an air-bubble removal program executed by a controller according to the second embodiment.

FIG. 7 is a flowchart illustrating example processing by the air-bubble removal program executed by the controller 26B according to the second embodiment. The processing shown in the flowchart in FIG. 7 starts by turning on the ignition switch, and after execution of initialization (Step S100), the processing steps from Step S110 onward are repeated every predetermined control cycle.

In the flowchart in FIG. 7, in lieu of the processing in Step S140 in FIG. 4, the processing in Step S240 is added. And, the processing in Step S243 is added between Step S240 and Step S150, and the processings in Steps S246, S248, which are to be executed if the determination in Step S243 is negative, are added.

In Step S240, the controller 26B reads a value (sound velocity v) detected by the concentration sensor 32, and obtains a urea water concentration C calculated from the sound velocity, and also acquires a discharge pressure Pp of the urea water pump 23 detected by the pressure sensor 24, after which the controller 26B proceeds to Step S243.

In Step S243, the controller 26B determines whether or not the discharge pressure pp acquired in Step S240 is at or above the threshold Pp0. If the determination in Step S243 is affirmative, Step S243 is followed by Step S150. If the determination in Step S243 is negative, Step S243 is followed by Step S246.

In Step S246, the controller 26B clears the injection timer Ti (Ti=0), and then proceeds to Step S248. In Step S248, the controller 26B sets the static standby timer value Ts to the set value Ts2, and then returns to Step S110.

According to the second embodiment as described above, the following advantageous effects are provided in addition to the same advantageous effects as those in the first embodiment.

(6) In a state of low discharge pressure Pp of the urea water pump 23 (in a state of less than the threshold Pp0), even if the second injection valve 30a of the air-bubble removal device 30 is opened, a strong jet flow cannot be generated, which may cause inadequate removal of air bubbles adhering to the sensing part 32a of the concentration sensor 32. In the present embodiment, based on the value (the urea water concentration C) detected by the concentration sensor 32 and the value (the discharge pressure Pp of the urea water pump 23) detected by the pressure sensor 24, the controller 26B controls the urea water injection by the air-bubble removal device 30. This enables effective removal of air bubbles adhering to the sensing part 32a of the concentration sensor 32.

(7) Because the air-bubble removing operation is not performed by the air-bubble removal device 30 in the state of low discharge pressure Pp of the urea water pump 23, this makes it possible to minimize a reduction in the amount of urea water supplied to the urea SCR for the exhaust purification as originally intended purpose.

(8) A standby time period is set to keep the air-bubble removing operation from being performed by the air-bubble removal device 30 over a predetermined time period after a change from the state of low discharge pressure Pp (the state of less than the threshold Pp0) to the state of high discharge pressure Pp (the state of equal to or greater than the threshold Pp0).

Assuming that the standby time is not set. The air-bubble removing operation is performed by the air-bubble removal device 30 under unstable conditions where the discharge pressure Pp exceeds or becomes below the predetermined pressure Pp1, which in turn raises the possibility of an unstable flow of urea water injected from the second injection valve 30a. Further, if the second injection valve 30a is opened under the unstable conditions of the discharge pressure Pp, a long time until the discharge pressure Pp becomes stable may be required due to a momentary decrease of the discharge pressure Pp caused by the opening of the second injection valve 30a. As a result, the conditions where the amount of urea water supplied from the first injection valve 27a of the urea water injector 27 into the urea water SCR is unstable may persist for a long time.

In the present embodiment, the standby time period is set to keep the air-bubble removing operation from being performed by the air-bubble removal device 30 over a predetermined time period even after the discharge pressure Pp changes from a low state to a high state. Because of this, the discharge pressure Pp is able to be stabilized at an earlier stage to enable prevention of the air-bubble removing operation from being performed under the unstable conditions by the air-bubble removal device 30.

Modifications as described below fall within the scope of the present invention, and one or some of modifications can be combined with the aforementioned embodiment(s).

(First Modification)

Although, in the above-described embodiments, an example has been described which controls the urea water injection by the air-bubble removal device 30 on the basis of either a value detected by the concentration sensor 32 or a value detected by the concentration sensor 32 and a value detected by the pressure sensor 24, the present invention is not limited to this. For example, without regard for the concentration C and/or the discharge pressure Pp, the air-bubble removal device 30 may inject the urea water for a predetermined time every lapse of predetermined time period. If the urea water is injected at regular time intervals to remove air bubbles, the measurement accuracy of the concentration sensor 32 can be improved as compared with the case where the urea water is not injected. Alternatively or additionally, an air-bubble switch (not shown) may be installed so that a worker manually operates to cause the air-bubble removal device 30 to inject the urea water.

(Second Modification)

The exhaust gas purifying device may include an oxidation catalyst (DOC: Diesel Oxidation Catalyst) to oxidize and remove nitrogen monoxide (NO), carbon monoxide (CO), carbon hydride (HC) and/or the like included in the exhaust gas, in addition to the NOx purifying device 19. The exhaust gas purifying device may be a filter to trap particulates (particulate matter).

(Third Modification)

Although, in the aforementioned embodiments, an example has been described which places the sensing part 32a of the concentration sensor 32 in the urea water tank 22, the present invention is not limited to this. The sensing part 32a of the concentration sensor 32 may be installed in any place where the urea water is stored, either on the urea water flow path from the urea water tank 22 to the urea water pump 23 or the urea water flow path from the urea water pump 23 to the urea water injector 27. It is noted that, in the case of the placement on the urea water flow path, a space with the wider flow-passage area than the flow-passage area of the first piping 29a is created, and the sensing part 32a of the concentration sensor 32 is placed in the space. It is desirable that the sensing part 32a is installed in a position with a small change in velocity of flow of the urea water within the above-described space, in order to inhibit the detection value (concentration C) of the sensing part 32a of the concentration sensor 32 from being affected by the velocity of flow of the urea water.

(Fourth Modification)

Although, in the aforementioned embodiments, an example has been described which provides a single urea water pump 23 and divides the piping on the discharge side of the urea water pump 23 into branches to be connected to the urea water injector 27 and the air-bubble removal device 30, the present invention is not limited to this. Two pumps may be provided: a first urea water pump to supply the urea water to the urea water injector 27 and a second urea water pump to supply the urea water to the air-bubble removal device 30. In this case, a flow passage connecting the urea water injector 27 and the urea water tank 22, and a flow passage connecting the air-bubble removal device 30 and the urea water tank 22 can be individually installed.

(Fifth Modification)

Although, in the aforementioned embodiments, an example has been described which operates the air-bubble removal device 30 (open the second injection valve 30a) in the first place when the concentration C is at or above the threshold Cx (when in the high concentration state), and then causes the display device 33 to display "high concentration error" if the concentration C remains high even after the operation of the air-bubble removal device 30, the present invention is not limited to this. The message "high concentration error" may not be displayed on the display device 33. In this case, the air-bubble removal device 30 may not be operated when the concentration C is at or above the threshold Cx.

When the value detected by the concentration sensor 32 is a value representing that at least the urea water is in the low concentration state, the urea water injection is started by the air-bubble removal device 30, thereby preventing nitrogen oxides from being sufficiently decomposed.

(Sixth Modification)

An example has been described which adopts urea water as a reducing agent. However, an aqueous ammonia solution or other reducing agents may be adopted as a reducing agent to generate ammonia with efficiency.

(Seventh Modification)

Although in the aforementioned embodiment, an example has been described which uses the single controller 26, 26B to control the urea water pump 23, the urea water injector 27 and the air-bubble removal device 30, the present invention is not limited to this. The processing executed by the above-described controller 26, 26B may be executed by a plurality of controllers.

(Eighth Modification)

Although in the aforementioned embodiment, an example has been described which employs a sound velocity measurement type concentration sensor as the concentration sensor 32, the present invention is not limited to this. As the concentration sensor 32, a ultrasound attenuation type concentration sensor may be employed, the ultrasound attenuation type concentration sensor including a sensing part which includes a transmission sensor transmitting ultrasound waves and a receiving sensor placed opposite the transmission sensor, and computing the amount of attenuation from the ultrasound receiving sensitivity to convert the amount to a concentration.

(Ninth Modification)

An example of applying the present invention to a hydraulic excavator has been described in the aforementioned embodiments, but in addition the present invention may be applied to a fixed excavator and a mobile excavator such as a wheel excavator. Moreover, the present invention may be similarly applied to various work machines such as a crane, a wheel loader and the like.

The various embodiments and modifications have been described, but the present invention is not intended to be limited to these details. Other forms contemplated as falling within the technical spirit of the present invention falls within the scope of the invention.

REFERENCE SIGNS LIST

1 . . . Engine
19 . . . NOx purifying device
20 . . . Urea water (reducing agent)

22 . . . Urea water tank (storage unit)
23 . . . Urea water pump (reducing agent pump)
24 . . . Pressure sensor
26, 26B . . . Controller (air-bubble removal control device)
27 . . . Urea water injector (reducing agent injector)
27a . . . first injection valve
29a . . . First piping (piping forming first flow passage)
29b . . . Second piping (piping forming second flow passage)
30 . . . Air-bubble removal device
30a . . . Second injection valve
32 . . . Concentration sensor
32a . . . Sensing part
100 . . . Exhaust gas purifying device
301 . . . Injection port

The invention claimed is:

1. An exhaust gas purifying device of a work machine, including a reduction catalyst that is placed in an exhaust flow passage of an exhaust gas of an engine and uses a reducing agent to reduce and purify nitrogen oxides in the exhaust gas, and a reducing agent injector to inject the reducing agent into the exhaust flow passage, the exhaust gas purifying device of the work machine comprising:
a urea water tank that stores the reducing agent;
a concentration sensor that has a sensing part placed within the urea water tank to detect a concentration of the reducing agent;
an injection valve that injects the reducing agent toward the sensing part;
a reducing agent pump that supplies the reducing agent in the urea water tank to the injection valve;
a pressure sensor that detects a discharge pressure of the reducing agent pump; and
an air-bubble removal controller that controls, based on a value detected by the concentration sensor and a value detected by the pressure sensor, injection of the reducing agent performed by the injection valve.

2. The exhaust gas purifying device of a work machine according to claim 1, wherein the air-bubble removal controller causes the injection valve to start injecting the reducing agent, when the value detected by the concentration sensor is a value representing that at least the reducing agent is in a low concentration state.

3. The exhaust gas purifying device of a work machine according to claim 1, wherein a second flow passage through which the reducing agent discharged from the reducing agent pump is supplied to the injection valve is connected to a first flow passage that connects a discharge side of the reducing agent pump and the reducing agent injector.

* * * * *